United States Patent Office 2,864,811
Patented Dec. 16, 1958

2,864,811

METHODS OF TREATING PULP MILL ALKALINE BLEACH EFFLUENTS

Joseph B. Doughty, Charleston, and William R. Cook, Hartsville, S. C., assignors to West Virginia Pulp and Paper Company, New York, N. Y., a corporation of Delaware No Drawing. Application November 5, 1956
Serial No. 620,168

5 Claims. (Cl. 260—124)

Our present invention relates to methods of treating pulp mill alkaline bleach effluents, both to recover chlorinated lignin therefrom, and to render the treated effluent less active as a pollutant when added to the mill stream.

The pulps obtained from the usual pulping operations (kraft, soda, or sulfite) are normally brown or grey in color. This color is due, for the most part, to lignin or lignin decomposition products with certain gums or resins having a minor part in the discoloration. To prepare many types of papers from pulp it is necessary to remove this color. The most economical and widely used method of reducing the color of pulps is chlorination. The process of bleaching is dependent upon the reaction of the chlorine with the lignin to give water soluble products which are washed out of the pulps. In general, the process is composed of three basic steps: (1) drainage and washing pulps free of black liquor; (2) reaction of chlorine with lignin and other color bodies in the washed pulp; (3) washing chlorinated lignin products from pulp. There are many modifications of this process with the differences generally being in the manner and number of washes. In about all proposed procedures the pulp is washed with an alkaline solution soon after the chlorine treatment. Any solution of the commercial alkalies may be used, including lime, sodium hydroxide, and potassium hydroxide. Most of the lignin of the pulp is dissolved in this alkaline wash and is thereby removed from the pulp. Where a high degree of brightness is required in the pulp, additional bleaching procedures may be used beyond the alkaline wash. Hypochlorite or chlorite bleaches are sometimes used. These secondary procedures are used to remove the final traces of color from the pulp.

In carrying out our invention we therefore treat the alkaline wash from the chlorinated pulp for recovery of the chlorinated lignin since it contains by far the greatest part of the lignin removed from the pulp in the bleaching operation. The problem of its removal, however, is rendered difficult because the concentration of the chlorinated lignin therein is very small, i. e. on the order of 0.5 percent. Because of this high dilution, recovery by evaporation would be too costly. Since the chlorinated lignins have reduced solubility in solutions of low pH value, it has been suggested that they be precipitated by addition to the solution of sulfuric or other strong acid. While precipitation takes place upon this addition, the resulting lignin particles are colloidal or near colloidal in size so as to be completely unfilterable; furthermore they settle with the greatest of difficulty and therefore do not lend themselves to recovery by the use of conventional settling basins or clarifiers.

We have now discovered that chlorinated lignin can be precipitated from alkaline wash liquors of the type mentioned in a form that can be filtered or settled out, if the liquor is made acid with aluminum sulfate (paper maker's alum).

It is therefore a principal object of our invention to recover chlorinated lignin from pulp mill bleach effluents which are normally discharged as a waste with consequent reduction of the biological oxygen demand (B. O. D.) of the treated liquor and its greater acceptability in the mill stream. Other objects of our invention will be apparent as the description proceeds and the features of novelty will be pointed out in the appended claims.

The exact function of the aluminum sulfate in precipitating the chlorinated lignin is not known. While as above pointed out, the reduction of the pH of the solution is no doubt a factor, it does not account for the full action of the aluminum sulfate. It is possible that the presence of the trivalent positive aluminum ion in solution may aid the coagulation of the chlorinated lignin so that it can be settled or filtered. The aluminum may also react with the chlorinated lignin to form a salt due to the presence in the lignin of a phenolic hydroxly or carboxyl group. Normally lignins do not contain carboxyl groups, but it is known that these may be added by oxidation, such as may occur in the bleaching action by chlorine.

The following examples will serve to illustrate our invention:

*Example I*

One liter of chlorine bleach effluent from the chlorine bleaching of pulp from a sulfite cook of a mixture of birch and beech wood was heated to 90°C., and as the hot solution was rapidly stirred, 50 ml. of a 5 percent solution of aluminum sulfate was added. The hot mixture was filtered immediately to separate the precipitated lignin. Upon filtration the hot liquid component passed rapidly through a #2 Whatman filter paper and a clear filtrate was obtained. The lignin cake was washed on the filter with 100 ml. of hot water (65–70° C.) and then dried to constant weight in an oven at 105° C. The dry lignin weighed 1.93 g. which was 40 percent of the solids of the liquor. This chlorinated lignin contained 7.0 percent chlorine.

A second one-liter batch of the same bleach effluent was heated, reacted with aluminum sulfate, and filtered as above described. The lignin cake was washed with 100 ml. of 2 percent sulfuric acid, then with 100 ml. of water prior to drying. This acid washed lignin when dry weighed 1.76 g. which was 36 percent of the solids of the effluent. The chlorine content of this product was found to be 7.4 percent.

A one-liter batch of alkaline bleach effluent from the bleaching of pulp from a kraft cook of pine wood was heated, acidified, and filtered as described above. The liquor filtered easily and the lignin was washed with 100 ml. of hot water before drying to constant weight. The oven dry lignin weighed 1.81 g. which was 34 percent of the solids of the liquor. This chlorinated lignin contained 6.2 percent chlorine.

*Example II*

This example demonstrates the quantities of aluminum sulfate required to precipitate chlorinated lignin from an alkaline bleach effluent in a form that can be filtered or will settle out within a reasonable time.

To 100 g. batches of alkaline chlorine bleach effluent from the bleaching of the pulp from a sulfite cook of birch and beech wood were added various quantities of 5 percent aqueous aluminum sulfate solution. One-half of the batches were at 90° C. when the aluminum sulfate was added, while the remaining were at room temperature. After the addition of the aluminum sulfate the mixtures were divided in two equal parts. The first part was placed in a 50 ml. graduate and left standing to test for settling of the precipitates. If the precipitated lignin settled to within 20 percent of its original volume within three to four hours it was considered as satisfactory. The second part of each acidified mixture was filtered on a Buchner funnel fitted with a qualitative filter paper and under the vacuum of a water aspirator. If the mixture passed through the filter within five minutes and gave a clear filtrate, it was considered satisfactory. The ease of settling and filterability of the so treated liquors are given in the following table.

| Aluminum sulfate, lb./lb. lignin | Temperature, °C. | Precipitate can be filtered | Precipitate will settle |
|---|---|---|---|
| 0.26 | 90 | No | No. |
| 0.69 | 90 | No | Yes. |
| 1.00 | 90 | No | Yes. |
| 1.40 | 90 | Yes | Yes. |
| 2.00 | 90 | Yes | Yes. |
| 0.96 | Room | No | No. |
| 2.50 | Room | No | Yes. |
| 3.60 | Room | No | Yes. |
| 5.00 | Room | No | Yes. |
| 7.30 | Room | No | Yes. |

It is apparent from the foregoing that satisfactory results are to be had by using from 0.69 to 2.50 pounds aluminum sulfate per pound of recovered lignin. It is also obvious that it is of advantage to have the effluent hot when precipitation takes place.

It will be understood that variations in the improved method may be practiced without departing from the spirit of our invention or the scope of the appended claims.

We claim:
1. A method of treating alkaline pulp mill chlorine bleach effluents containing chlorinated lignin in low concentration to recover same which comprises adding thereto aluminum sulfate in quantity sufficient to precipitate the chlorinated lignin and recovering the precipitate.
2. The method according to claim 1 in which the aluminum sulfate is added to said effluent in the hot.
3. The method according to claim 1 in which the chlorinated lignin is recovered by settling.
4. The method according to claim 1 in which the concentration of chlorinated lignin in the effluent started with is on the order of 0.5 percent.
5. The method according to claim 1 in which the amount of aluminum sulfate added to said effluent per pound chlorinated lignin therein is from 0.69 to 7.3 pounds.

References Cited in the file of this patent
UNITED STATES PATENTS

| 1,441,243 | Romer | Jan. 9, 1923 |
| 2,482,594 | Pearl | Sept. 20, 1949 |

FOREIGN PATENTS

| 527,407 | Canada | July 10, 1956 |